US010630937B1

United States Patent
Low et al.

(10) Patent No.: US 10,630,937 B1
(45) Date of Patent: Apr. 21, 2020

(54) DEVICE, SYSTEM AND METHOD FOR TRANSMITTING ONE OR MORE OF ANNOTATIONS AND VIDEO PRIOR TO A VIDEO CALL

(71) Applicant: MOTOROLA SOLUTIONS, INC., Chicago, IL (US)

(72) Inventors: Siew Im Low, Pulau Pinang (MY); Lee Hoon Beh, Pulau Pinang (MY); Kee Sin Thong, Pulau Pinang (MY); Yee Yeong Yeng, Pulau Pinang (MY); Yih Jian Chuah, Pulau Pinang (MY); Wai Mun Lee, Perak (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/226,052

(22) Filed: Dec. 19, 2018

(51) Int. Cl.
*H04N 7/14* (2006.01)
*H04M 1/725* (2006.01)
*H04L 29/06* (2006.01)

(52) U.S. Cl.
CPC ........... *H04N 7/147* (2013.01); *H04L 63/105* (2013.01); *H04L 65/1069* (2013.01); *H04M 1/72552* (2013.01); *H04M 1/72555* (2013.01); *H04M 1/72569* (2013.01); *H04N 7/142* (2013.01)

(58) Field of Classification Search
CPC ...................................................... H04N 7/14
See application file for complete search history.

(56) References Cited

U.S. PATENT DOCUMENTS

| | | | |
|---|---|---|---|
| 6,377,664 B2 * | 4/2002 | Gerszberg | H04M 1/253 348/14.11 |
| 6,507,356 B1 | 1/2003 | Jackel et al. | |
| 7,548,255 B2 | 6/2009 | Bear et al. | |
| 7,590,229 B2 * | 9/2009 | Bangor | H04M 3/42068 379/142.06 |
| 8,154,578 B2 | 4/2012 | Kurtz et al. | |
| 8,159,519 B2 | 4/2012 | Kurtz et al. | |
| 8,253,770 B2 | 8/2012 | Kurtz et al. | |

(Continued)

OTHER PUBLICATIONS

Schejbal, Jan, "Room Noise Reduction in Audio and Video Calls", Nov. 6, 2017, Technical Disclosure Comments, Defensive Publications Series, downloaded from http://www.tdcommons.org/dpubs_series.

(Continued)

*Primary Examiner* — Olisa Anwah
(74) *Attorney, Agent, or Firm* — Perry + Currier, Inc.

(57) ABSTRACT

A device, system and method for transmitting one or more of annotations and video prior to a video call is provided. A communication device receives a request for a video call from a first communication device, of other communication devices. Prior to the video call being established, the communication device: determines whether a user of the first communication device is an authorized caller; and when the user of the first communication device is an authorized caller, transmits, to the first communication device, one or more of annotations received at the input device and video from a video camera. The determination of whether a user of the first communication device is an authorized caller is based on profile data associated with users of one or more of the other communication devices.

20 Claims, 6 Drawing Sheets

(56) References Cited

U.S. PATENT DOCUMENTS

| | | | |
|---|---|---|---|
| 8,594,317 B2* | 11/2013 | Clark | H04M 3/42017 379/373.02 |
| 8,874,086 B2 | 10/2014 | Huang et al. | |
| 8,917,306 B2 | 12/2014 | Zhang | |
| 9,350,943 B2* | 5/2016 | Pycock | H04N 7/147 |
| 9,578,070 B2 | 2/2017 | Bain et al. | |
| 9,762,729 B1 | 9/2017 | Sales et al. | |
| 9,832,308 B1 | 11/2017 | Rogers et al. | |
| 10,013,506 B2 | 7/2018 | Reeves et al. | |
| 2003/0041333 A1 | 2/2003 | Allen et al. | |
| 2008/0186255 A1 | 8/2008 | Cohen et al. | |
| 2008/0273077 A1* | 11/2008 | Cowherd | H04M 3/5315 348/14.06 |
| 2008/0298563 A1* | 12/2008 | Rondeau | H04M 3/53391 379/88.22 |
| 2009/0092234 A1* | 4/2009 | St. Onge | H04L 12/1818 379/88.13 |
| 2009/0199228 A1 | 8/2009 | Novak et al. | |
| 2010/0020944 A1* | 1/2010 | Ray | G06Q 20/102 379/87 |
| 2011/0319104 A1* | 12/2011 | Williams | H04W 4/16 455/466 |
| 2012/0069051 A1 | 3/2012 | Hagbi et al. | |
| 2012/0287231 A1* | 11/2012 | Ravi | H04N 7/148 348/14.12 |
| 2013/0023245 A1* | 1/2013 | Carmichael | H04W 4/12 455/413 |
| 2013/0100238 A1 | 4/2013 | Wharton | |
| 2015/0007214 A1 | 1/2015 | Bruns et al. | |
| 2016/0044177 A1* | 2/2016 | O'Brien | H04M 3/53383 379/88.22 |
| 2019/0045056 A1* | 2/2019 | Duan | H04M 3/42382 |

OTHER PUBLICATIONS http://www.etsi.org/standards-search; ETSI TS 123 281 V14.3.0 (Oct. 4, 2017).
https://support.zoom.us/hc/en-us/articles/115005706806-Annotation-as-a-Viewer, downloaded Sep. 18, 2018.
https://www.oxagile.com/company/blog/a-developers-guide-to-annotating-webrtc-video/; downloaded Sep. 18, 2018.
https://tokbox.com/blog/introducing-the-annotation-widget-in-beta/; downloaded Sep. 18, 2018.
https://netstorage.ringcentral.com/guides/meetings_user_guide.pdf (Sep. 12, 2018).
https://www.bodyworn.com/platform/avail-web/; downloaded Sep. 18, 2018.

* cited by examiner

US 10,630,937 B1

DEVICE, SYSTEM AND METHOD FOR TRANSMITTING ONE OR MORE OF ANNOTATIONS AND VIDEO PRIOR TO A VIDEO CALL

BACKGROUND OF THE INVENTION

A first responder may be operating a communication device capable of making video calls. However, the first responder may be in a situation where his environment and/or surroundings may be confidential, for example at a crime scene and the like. However, the first responder may need to share information and/or video information with a superior officer and/or another first responder. The situation presents a few challenges. Firstly, it may take an unacceptable amount of time to establish a video call with a superior officer and/or another first responder (e.g. a few seconds or minutes delay) which may cause delays in critical decision making. Secondly, the first responder may receive video calls from both his superior officer (and/or another first responder) as well as non-first responders, such as family or the press, and the like, and the first responder may accidently share confidential information about his environment and/or surroundings via video with the non-first responders.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
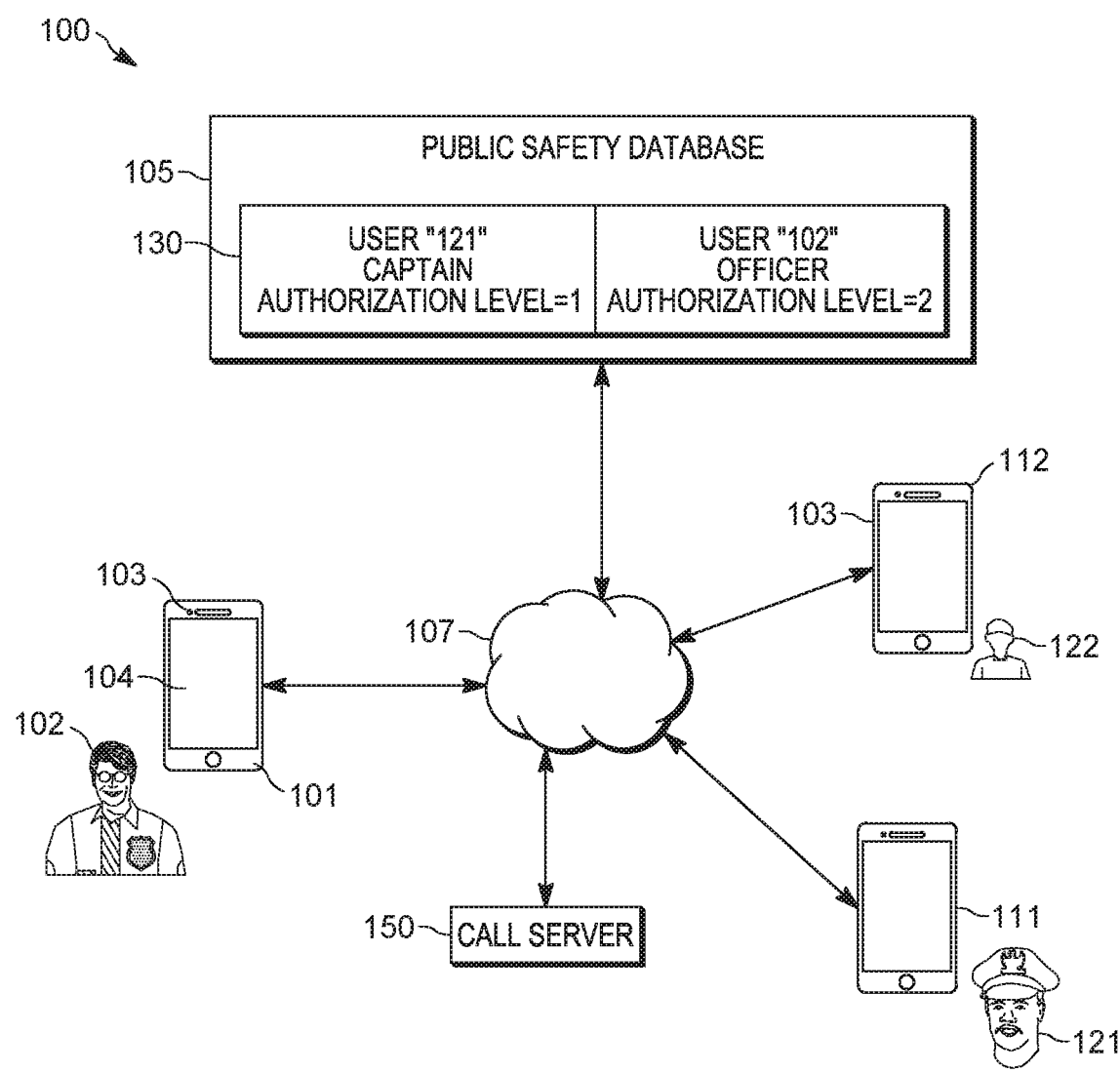
FIG. 1 is a system for transmitting one or more of annotations and video prior to a video call, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a communication device comprising: a communication unit configured to communicate with other communication devices; a video camera; an input device; and a controller communicatively coupled to the communication unit, the video camera, and the input device, the controller having access to a memory storing profile data associated with users of one or more of the other communication devices, the controller configured to: receive, via the communication unit, a request for a video call from a first communication device, of the other communication devices; and prior to the video call being established: determine whether a user of the first communication device is an authorized caller; and when the user of the first communication device is an authorized caller, transmit, to the first communication device, via the communication unit, one or more of annotations received at the input device and video from the video camera.

Another aspect of the specification provides a method comprising: receiving, at a first communication device, a request for a video call from a second communication device, of a plurality of second communication devices, the first communication device having access to a memory storing profile data associated with users of one or more of the plurality of second communication devices; and prior to the video call being established: determining, at the first communication device, whether a user of the second communication device is an authorized caller; and when the user of the second communication device is an authorized caller, transmitting, from the first communication device to the second communication device, one or more of annotations received at an input device and video from a video camera.

Attention is directed to FIG. 1, which depicts an example system 100 for transmitting one or more of annotations and video prior to a video call. The system 100 comprises a communication device 101 associated with and/or operated by a user 102, such as a first responder, and the like, including, but not limited to, a police officer, a fire fighter, an emergency medical technician (EMT) and the like. However, while current examples are described with respect to first responders, in other examples the user 102 may be an employee of a business entity, a member of the public, and the like.

As depicted, the communication device 101 is interchangeably referred to hereafter as the device 101. As depicted, the device 101 comprises at least one video camera 103 and an input device 104 (e.g. as depicted a touch screen display). While as depicted the device 101 comprises a mobile communication device, the device 101 may comprise any suitable communication device that includes a video camera 103 and an input device 104 including, but not limited to, body-worn cameras, vehicle-mounted communication devices, and the like. Indeed, in some examples, the device 101 is not a mobile device but rather a non-mobile communication device, such as a personal computer and the like.

Furthermore, while the depicted video camera 103 is on a front of the device 101, the device 101 may include more than one video camera 103, for example, a first video camera 103 on a front of the device 101 and a second video camera at a rear of the device 101.

In the example of FIG. 1, the system 100 further comprises a public safety database 105 (interchangeably referred to hereafter as the database 105) in communication with the device 101 via at least one communication network 107 (interchangeably referred to hereafter as the network 107) and via respective wired or wireless communication links thereto. The network 107 may include, but is not limited to, one or more of the Internet, a cell phone network, and a public safety communication network, and the like. Furthermore, communication links are depicted in FIG. 1 as double-ended arrows between the network 107 and respective components of the system 100.

The system 100 further comprises other communication devices including, but not limited to a first communication device 111 and a second communication device 112. The device 101 is further configured to communicate with the communication devices 111, 112 via the network 107.

As depicted, the first communication device 111 is associated with a user 121, for example a superior officer of the user 102. However, the second communication device 112 is associated with a user 122, for example a friend and/or family member of the user 102 and/or a member of the press, and/or another user and/or a user who is not a first responder.

In particular, the database 105 stores profile data 130 associated with users of one or more of the other communication devices 111, 112. For example, as depicted, the profile data 130 includes profile information of the user 121 including a rank (e.g. "Captain") and an authorization level (e.g. "1"), and profile information of the user 102 including a rank (e.g. "Officer") and an authorization level (e.g. "2").

Hence, as depicted, the database 105 comprises a storage device (and any suitable computing and communication components) that stores profile data for associated responders and may be operated by an entity with which the users 102, 121 are associated, such as a police department.

However, in other examples, the users 102, 121 may be employees of a company, and the like, and the database 105 may store profile for the employees. In yet further examples, the database 105 may store profiles for consumers, and friends, family and/or colleagues of the consumers, for example as part of a cloud-based directory.

In general, the rank and/or authorization level of user 121 in the profile data 130 may be optional; rather, the profile data 130 generally indicates whether the user 121 is an authorized user or an unauthorized user, relative to the user 102. However, as depicted, the rank and/or authorization level of user 121 in the profile data 130 indicates that the user 121 is an authorized user and/or an authorized caller (e.g. when the user 121 operates the communication device 111 to call the communication device 101) as the user 121 may have a rank superior to the user 102 (e.g. "Captain" is superior to "Officer"), and furthermore may have an authorization level indicative of being an authorized user and/or an authorized caller, for example relative to the user 102 (e.g. an authorization level of "1" indicates that the user 121 is an authorized user and/or an authorized caller relative to an authorization level of "2" of the user 102). When the database 105 stores employee profile data and/or consumer profile data, the profile data 130 is adapted accordingly and may store other types of indicators of users being authorized users and/or authorized callers.

Furthermore, the structure and/or contents of the profile data 130 may include an identifier of the communication device 111 associated with the user 121, such as an associated telephone number and/or an associated serial number and/or an associated Media Access Control (MAC) address, and/or any other data that might be received with a request for a video call and which would enable the device 101 to determine whether the user 121 is an authorized caller (e.g. when the user 121 operates the communication device 111 to call the communication device 101).

However, as the user 122 is not a first responder, and the like, the database 105 does not include profile data for the user 122. Hence, the absence of any profile data for the user 122 indicative of the user 122 being an unauthorized user and/or an unauthorized caller (e.g. when the user 122 operates the communication device 112 to call the communication device 101). In yet further examples, the database 105 may include profile data 130 of the user 122 indicating that the user 122 (e.g. and/or an associated identifier of the communication device 112) is an unauthorized user and/or an unauthorized caller. In some examples, the database 105 may store a white list of authorized callers and/or a black list of unauthorized callers.

Furthermore, the profile data 130 may also store authorization levels of unauthorized callers who may also be first responders, and the like. For example, another captain in a police force may be in a different unit as the user 102; hence, while such a captain may be associated with the same entity as the user 102, such a captain may be an unauthorized user which may be indicated via an assigned authorization level. Schemes that use authorization level for unauthorized callers are described below.

In yet further examples, a portion of the database 105 may be stored at a memory of the device 101.

As, the system 100 further includes a call server 150, and the like, for establishing video calls and the like between the devices 101, 111, 112. The call server 150 may comprise any suitable combination of for example call servers including, but not limited to, cell phone call servers, public safety call servers, Internet Protocol (IP) call servers (e.g. an IP PBX (private branch exchange), and the like).

Indeed, the communication device 101 is generally enabled to: receive a request for a video call from a first communication device 111 (e.g. via the call server 150), of the communication devices 111, 112; and prior to the video call being established (e.g. via the call server 150): determine whether the user 121 of the first communication device 111 is an authorized caller; and when the user 121 of the first communication device 111 is an authorized caller, transmit, to the first communication device 111 one or more of annotations received at the input device 104 and video from the video camera 103.

Any video transmitted prior to the video call being established may be transmitted as streaming data and the like, and not as video call data; for example, when a video call is established between the devices 101, 111, the call server 150 facilitates setting up a two-way video call between the devices 101, 111 with appropriate bandwidth and quality of service allocated for the video call. The one or more of the annotations received at the input device 104 and the video from the video camera 103 transmitted to the first communication device 111 prior to the video call being established may be transmitted in one-way data transmission and/or one-way media stream and/or one-way video stream from the device 101 to the first communication device 111 without allocated bandwidth and quality of service. Furthermore, the annotations and the video may transmit to the first communication device 111 without using the call server 150, for example when the call request includes an IP address, and the like, of the first communication device 111.

Furthermore, whether or not video is transmitted before a video call is established may depend on available bandwidth of the network 107. Annotations may include notes and/or annotations received via the input device 104, as well as any suitable photos, recordings, data, and the like stored at the communication device 101. In some examples, the authorization level in the profile data 130 may be used to filter and/or redact a portion of one or more the annotations and the video.

Furthermore, in some examples, the first communication device 111 may force the communication device 101 to share video, prior to a video call being established, by transmitting a request and/or command to the communication device 101 to turn on the video camera 103 and stream video to the first communication device 111.

When a request for a video call is received from the second communication device 112, however, and the user 122 is an unauthorized caller, the annotations and/or video are not transmitted. Indeed, after the video call with the second communication device 112 is established, the communication device 101 may conduct the video call with at least background images and background audio removed therefrom.

Figure 2:
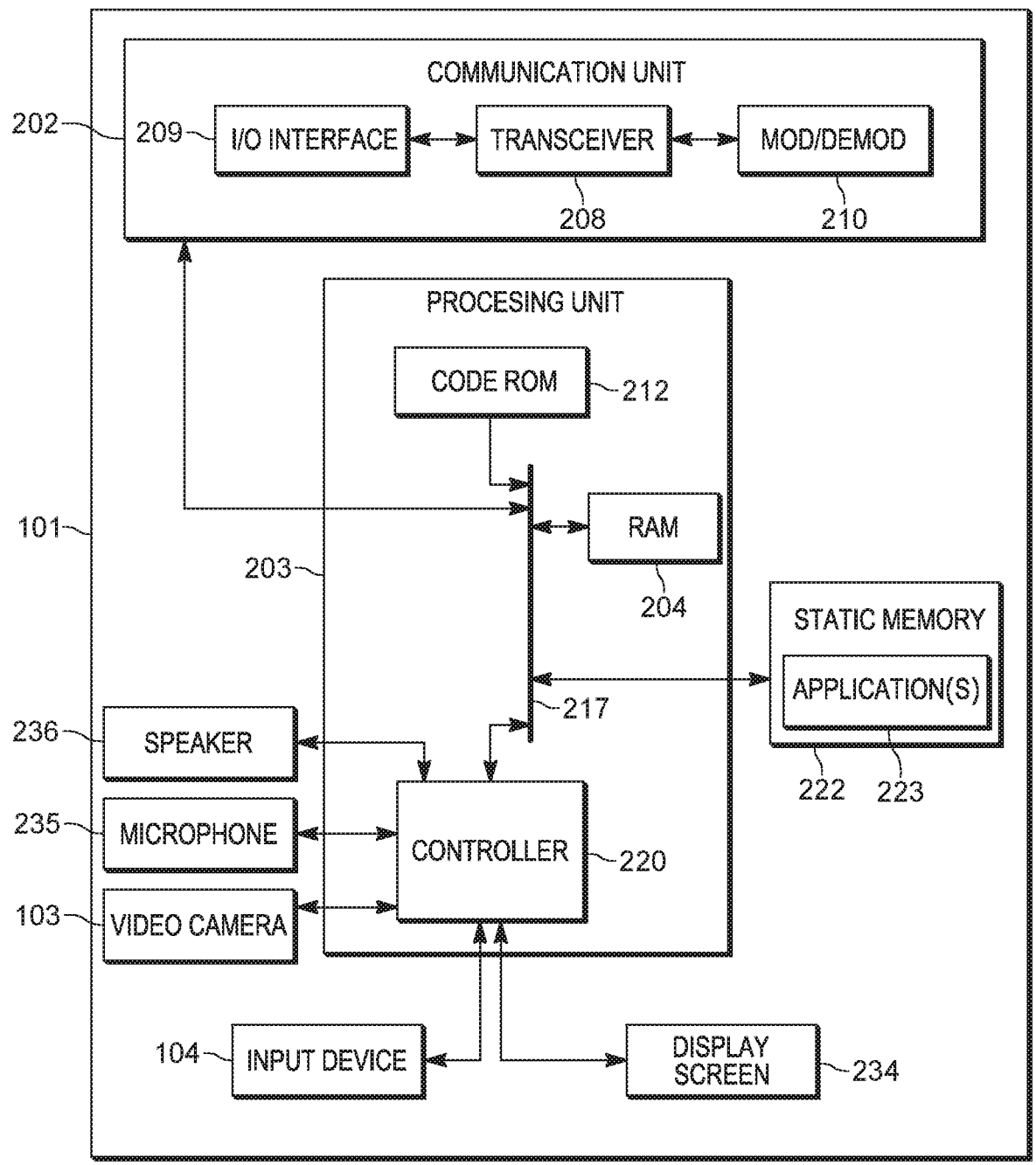
FIG. 2 is a device diagram showing a device structure of a communication device for transmitting one or more of annotations and video prior to a video call, in accordance with some examples.

Attention is next directed to FIG. 2 which depicts a schematic block diagram of an example of the device 101. In general, the device 101 may comprise: the video camera 103, the input device 104, a communications unit 202, a processing unit 203, a Random-Access Memory (RAM) 204, one or more wireless transceivers 208, one or more wired and/or wireless input/output (I/O) interfaces 209, a combined modulator/demodulator 210, a code Read Only Memory (ROM) 212, a common data and address bus 217, a controller 220, a static memory 222 storing at least one application 223, a display screen 234, a microphone 235 and the speaker 236.

Hereafter, the at least one application 223 will be interchangeably referred to as the application 223.

As shown in FIG. 2, the device 101 includes the communications unit 202 communicatively coupled to the common data and address bus 217 of the processing unit 203.

The input device 104 may comprise one or more of a keypad, pointing device, touch-sensitive surface (e.g. at the display screen 234, for example similar to as depicted in FIG. 1), and the like, and the display screen 234 may comprise a flat panel display, and the like, which, in some examples, may be include a touch screen and/or a touch-sensitive surface of the input device 104, and thus also act as an input device. The video camera 103 may comprise one or more video cameras that captures video and/or images of in a region around the device 101 (e.g. at a rear and/or front side of the device 101); the video.

Similarly, the microphone 235 and the speaker 236 may also be used to conduct video calls, and/or the audio detected by the microphone 235 may be transmitted with video from the video camera 103 and/or the microphone 235 may comprise a component of the video camera 103.

While not depicted, the device 101 may further include other devices such as location determining devices, and the like.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory 204 and the static memory 222.

The communications unit 202 may include one or more wired and/or wireless input/output (I/O) interfaces 209 that are configurable to communicate with the database 105 and the other communication devices 111, 112. For example, the communication unit 202 may include one or more transceivers 208 and/or wireless transceivers for communicating with the database 105 and the other communication devices 111, 112. Hence, the one or more transceivers 208 may be adapted for communication with the network 107. For example, the network 107 may comprise one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) networks, a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a Bluetooth transceiver, a Wi-Fi transceiver, a WiMAX transceiver, and/or another similar type of wireless transceiver configurable to communicate via a wireless radio network.

The communications unit 202 may optionally include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g. hardware ports) for coupling to other hardware components.

The controller 220 includes one or more logic circuits, one or more processors, one or more microprocessors, one or more ASIC (application-specific integrated circuits) and one or more FPGA (field-programmable gate arrays), and/or another electronic device. In some examples, the controller 220 and/or the device 101 is not a generic controller and/or a generic device, but a device specifically configured to implement functionality for transmitting one or more of annotations and video prior to a video call. For example, in some examples, the device 101 and/or the controller 220 specifically comprises a computer executable engine configured to implement functionality for transmitting one or more of annotations and video prior to a video call.

The static memory 222 is a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the device 101 as described herein are maintained, persistently, at the memory 222 and used by the controller 220 which makes appropriate utilization of volatile storage during the execution of such programming instructions.

In particular, the memory 222 stores instructions corresponding to the at least one application 223 that, when executed by the controller 220, enables the controller 220 to implement functionality for transmitting one or more of annotations and video prior to a video call. In illustrated examples, when the controller 220 executes the one or more applications 223, the controller 220 is enabled to: receive, via the communication unit 202, a request for a video call from a first communication device 111, of other communication devices 111, 112; and prior to the video call being established: determine whether a user 121 of the first communication device 111 is an authorized caller; and when the user 121 of the first communication device 111 is an authorized caller, transmit, to the first communication device 111, via the communication unit 202, one or more of annotations received at the input device 104 and video from the video camera 103.

In some examples, the memory 222 may further store a portion of the database 105, for example a portion of the profile data 130 that may be downloaded to the device 101 prior to the application 223 being implemented. In a particular example, the memory 222 may store one or more of a white list of authorized callers (e.g. with associated phone numbers and/or identifiers of associated communication devices), a black list of unauthorized callers (e.g. with associated phone numbers and/or identifiers of associated communication devices), the profile data 130 of associated colleagues and/or team members, and the like. For example, the memory 222 may store the profiled data 130 of the user 121.

While details of the communication devices 111, 112 are not depicted, each of the communication devices 111, 112 may have components similar to the device 101 adapted, however, for the respective functionality of the communication devices 111, 112. In particular, the communication devices 111, 112 each includes a display screen and a video camera to conduct video calls. Furthermore, while the communication devices 111, 112 are each depicted in FIG. 1 as being mobile communication devices, one or more of the communication devices 111, 112 may comprise a fixed communication device, including, but not limited to, a personal computer, a public safety dispatch terminal (e.g. for the communication device 111) and the like.

Figure 3:
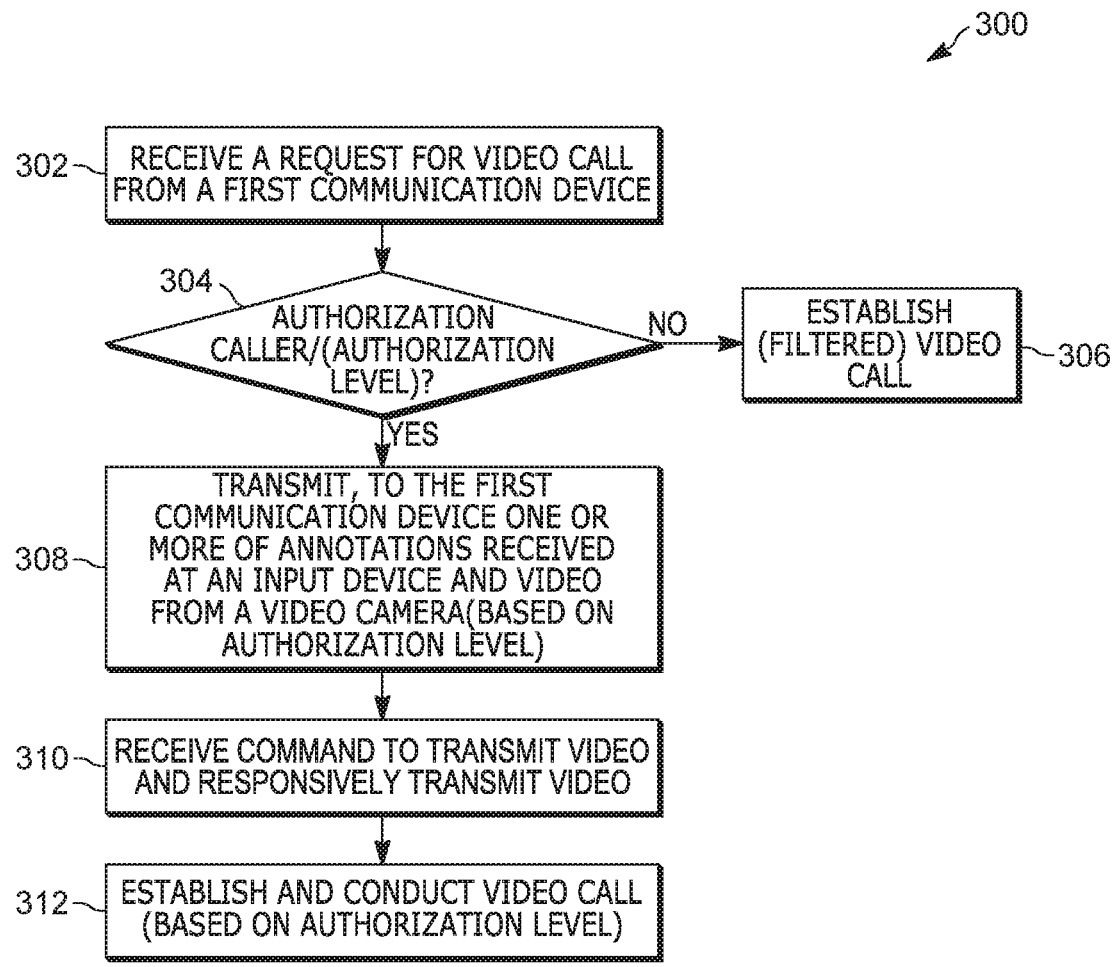
FIG. 3 is a flowchart of a method for transmitting one or more of annotations and video prior to a video call, in accordance with some examples.

Attention is now directed to FIG. 3 which depicts a flowchart representative of a method 300 for transmitting one or more of annotations and video prior to a video call. The operations of the method 300 of FIG. 3 correspond to machine readable instructions that are executed by the device 101, and specifically the controller 220 of the device 101. In the illustrated example, the instructions represented by the blocks of FIG. 3 are stored at the memory 222 for example, as the application 223. The method 300 of FIG. 3 is one way in which the controller 220 and/or the device 101 and/or the system 100 may be configured. Furthermore, the following discussion of the method 300 of FIG. 3 will lead to a further understanding of the system 100, and its various components. However, it is to be understood that the method 300 and/or the system 100 may be varied, and need not work exactly as discussed herein in conjunction with each other, and that such variations are within the scope of present examples.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 220 receives, via the communication unit 202, a request for a video call from a first communication device 111, of other communication devices 111, 112. As described above, request for a video call from the first communication device 111 may occur when the user 121 operates the first communication device 111 to "dial" the device 101, which causes a request for a video call to be received at the call server 150 which in turn routes the request for the video call to the device 101. The request for the video call may include, but is not limited, to an identifier of the first communication device 111, a phone number of the first communication device 111, an IP address of the first communication device 111, and the like.

Furthermore, receipt of the request for the video call at the block 302 may cause the device 101 to "ring" and/or "vibrate" and/or provide any suitable notification of the request for the video call including, but not limited to, controlling the display screen 234 to provide and/or render a "call answer" graphic user interface (GUI) and the like. It is understood that the video call is not established until the device 101 "picks up" the video call, for example via the user 102 operating the device 101 and/or interacting with the "call answer" GUI via the input device 104 to answer the video call. Specifically, the controller 220 may establish the video call upon receipt of input from the input device 104, the input for accepting the video call. However, the video call may not be established until after a given time period following the user 102 operating the device 101 and/or interacting with the "call answer" GUI to answer the video call, such that, in the given time period, appropriate signaling occurs between the call server 150 and the devices 101, 111 to allocate bandwidth and/or quality of service to establish the video call.

At a block 304, prior to a video call being established (which may be prior to the video call being answered at the device 101 and/or after the video call being answered at the device 101 but before the call server 150 can establish the video call), the controller 220 determines whether a user 121 of the first communication device 111 is an authorized caller. For example the controller 220 may query the database 105 and/or process any profile data 130 stored in the memory 222, using any identifiers of the first communication device 111 received with the request for the video call to determine whether the user 121 of the first communication device 111 is an authorized caller, for example as based on an authorization level, and the like, as described above.

Also at the block 304, the controller 220 may also determine an authorization level of the user 121, whether an authorized caller or an unauthorized caller, for example based on the profile data 130 as described above.

When the controller 220 determines that the user 121 is an unauthorized caller (e.g. a "NO" decision at the block 304), at a block 306 the controller 220 may establish the video call, for example, when the video call is answered at the device 101, etc. and appropriate signaling between the call server 150 and the devices 101, 111 occurs. For example, while the profile data 130 has been described with respect to the user 121 being an authorized caller, in other examples the user 121 may be an unauthorized caller similar to the user 122.

In some of these examples, prior to the video call being established, the controller 220 may be configured to determine, based on the profile data 130, whether the user 121 of the first communication device 111 is one or more of an unauthorized caller (e.g. based on the profile data 130) or is not included in the profile data 130.

In these examples (e.g. when the user 121 is an unauthorized caller similar to the user 122), the controller 220 may be further configured to, prior to the video call being established, and in response to determining that the user 121 is an unauthorized caller, not transmit annotations or video, as described below. Furthermore, in some of these examples, the controller 220 may be further configured to, after the video call is established, and in response to determining that the user 121 is an unauthorized caller: not transmit the annotations (e.g. on the video call); and conduct the video call with at least background images and background audio removed therefrom, for example to filter the video call to hide possibly sensitive and/or confidential images therefrom. For example, the controller 220 may be further configured to, after the video call is established: transmit the video including one or more of foreground images and foreground audio of the respective user 102 of the communication device 101. Hence, video transmitted on the video call may include a foreground image of the user 102 and audio from the user 102, with the background images and background audio hidden and/or filtered (e.g. greyed out, and the like). However, in other examples, in response to determining that the user 121 is an unauthorized caller, the controller 220 may not filter the video call, however, no annotations are transmitted.

However, in some examples, described in more detail below, some annotations may be transmitted at the block 306 depending on authorization level of an unauthorized caller.

Returning to the block 304, when the user 121 of the first communication device 111 is an authorized caller (e.g. a "YES" decision at the block 304), at a block 308, the controller 220 transmits, to the first communication device 111, via the communication unit 202, one or more of annotations received at the input device 104 and video from the video camera 103. As the video call is not established, at the block 304, video is not received from the first communication device 111.

In some examples, the annotations are associated with a current incident assigned to the respective user 102 of the communication device 101. For example, the annotations may comprise notes, and the like, associated with a current incident to which the user 102 and/or the user 121 has been assigned and/or dispatched. The current incident may be assigned via a dispatch command. The annotations may be received at the input device 104. However, the annotations may comprise any associated information regarding the current incident including, but not limited to, photos, recordings, data, and the like associated with the incident and stored at the device 101.

The video may comprise live video as captured by the video camera 103. For example, at the block 308, the controller 220 may turn the video camera 103 and livestream video therefrom to the first communication device 111 (e.g. without video being received from the first communication device 111). Alternatively, when the device 101 includes more than one video camera, the controller 220 may turn one or more of the video cameras and live-stream video from one or both of the video cameras to the first communication device 111.

In some examples, transmitting annotations or video, or both, may depend on available bandwidth. For example, the controller 220 may be further configured to, at the prior to the video call being established: when bandwidth available for the video is below a threshold bandwidth, transmit the annotations to the first communication device 111 without the video; and when the bandwidth available for the video is above the threshold bandwidth, transmit the annotations to the first communication device with the video. The threshold bandwidth may comprise a bandwidth at which video of a given resolution is transmittable without loss of quality. Alternatively, the controller 220 may determine the bandwidth available and adjust the resolution of the video accordingly.

When the video and the annotations are transmitted together, the annotations may be overlayed on the video to indicate objects and/or persons in the video associated with respective annotations.

In examples where the authorization level is determined at the block 308, the controller 220 may filter a portion of one or more the annotations and the video based on the authorization level, for example to redact annotations based on authorization level. Hence, for example, annotations may be categorized by authorization level and annotations that are at (or below) the authorization level determined at the block 308 may be transmitted. Similarly, the video may be filtered based on the authorization level determined at the block 308, for example to filter out objects and/or people in the video that are categorized as being above the authorization level. Such filtering may occur via video analysis algorithms and/or machine learning algorithms at the device 101 that have been trained to filter out objects and/or people in video according to authorization levels. Hence, put another way, the controller 220 may be further configured to determine (e.g. at the block 308) an authorization level of the user 121 of the first communication device 111; and filter (e.g. at the block 310) a portion of one or more the annotations and the video based on the authorization level.

Such filtering may also include transmitting the video at different resolutions. Furthermore, the authorization level of the user 121 may depend on rank of the user 121. Similarly the annotations may be categorized by the authorization levels "Level 1", "Level 2" etc. Hence, a specific example scheme for transmitting annotations and video for authorized callers may be as follows:

For a rank of the user 121 being "CAPTAIN" and/or a higher rank than the user 102, an authorization level of "Level 1" is assigned (which may be stored in the profile data 130 and/or determined according to a stored rank) resulting in: no redaction of annotations and video transmitted at a resolution of 1080p.

For a rank of the user 121 being same rank as the user 102, an authorization level of "Level 2" is assigned (which may be stored in the profile data 130 and/or determined according to a stored rank) resulting in: redaction of annotations categorized at Level 1, and video transmitted at a resolution 720p.

For a rank of the user 121 being a lower rank as the user 102, an authorization level of "Level 3" is assigned (which may be stored in the profile data 130 and/or determined according to a stored rank) resulting in: redaction of annotations categorized at Level 1 and Level 2, and video transmitted at a resolution 480p.

In some examples, unauthorized callers may also be assigned an authorization level at the profile data 130, and the scheme above may be extended to transmitting annotations and video for unauthorized callers, as follows:

For a rank of the user 121 being a higher rank as the user 102, but the user 121 is an unauthorized caller, an authorization level of "Level 4" is assigned (which may be stored in the profile data 130 and/or determined according to a stored rank and/or other relationship with the user 102) resulting in: redaction of annotations categorized at Level 1, Level 2 and Level 3, and video transmitted with background images and background audio redacted (e.g. foreground video and foreground audio is transmitted); in these examples, the block 306 may be modified to include transmitting filtered annotations.

For other users (e.g. the user 122) who are not first responders, and are unauthorized callers, an authorization level of "Level 5" is assigned (which may be stored in the profile data 130 and/or determined according to a stored rank and/or other relationship with the user 102) resulting in: transmission of no annotations and all video blocked (e.g. audio only is transmitted); in these examples, the block 306 may be modified to transmit only audio.

In some examples, the controller 220 may be configured to: first transmit the annotations to the first communication device without the video; and, after the annotations are transmitted, transmit the video to the first communication device 111

In some of these examples, the annotations may be transmitted before the video such that the controller 220 may determine whether there is sufficient bandwidth to stream and/or transmit the video. In other examples, the annotations may be transmitted before the video such that the controller 220 may determine a resolution to stream and/or transmit the video given the available bandwidth.

However, in other examples, the annotations may be transmitted before the video and the video may be transmitted upon receipt, at an optional block 310, of a request and/or command to transmit the video (e.g. different from the request for the video call) from the first communication device 111.

For example, a "call transmit" and/or "call ringing" GUI at the first communication device 111 may be provided and/or rendered at a respective display screen of the first communication device 111 (e.g. that indicates that the request for the video call has been transmitted and the first communication device 111 is waiting for the device 101 to "pick up". The "call transmit" and/or "call ringing" GUI at the first communication device 111 may be modified to include a virtual button, and the like, that cause the device 101 to transmit video prior to the video call being established. When the virtual button and the like is actuated, the first communication device 111 may transmit the request and/or command to transmit the video to the device 101. In general, the first communication device 111 may be provided with such a virtual button to request video (and/or annotations) from the device 101 as the first communication device 111 may be associated with the same entity associated with the device 101 (e.g. a police organization). Hence, the "normal" "call transmit" and/or "call ringing" GUI at the first communication device 111 may be modified to include such a virtual button to request video (and/or annotations). Upon receipt of such a command, also at the block 310, the controller 220 responsively transmits the video.

However, as the user 122 and/or the second communication device 112 is not associated with the entity associated with the devices 101, 111, the second communication device 112 does not include such a virtual button.

Hence, in some examples, the controller 220 may be configured to, prior to the video call being established, first transmit the annotations, transmit the video upon receipt of a request and/or command to transmit the video from the first communication device 111 and/or only upon receipt of a request for the video from the first communication device 111 (e.g. different from a request for a video call as received at the block 302).

In some examples the controller 220 may be further configured to, prior to the video call being established, when the request for the video call is received, automatically transmit the annotations and/or the video to the first communication device 111.

However, in other examples, the controller 220 may be further configured to, prior to the video call being established, when the request for the video call is received, transmit the annotations and/or the video to the first communication device 111 upon receipt of confirmation data received at the input device 104. In these examples, the controller 220 may control the display screen 234 to provide and/or render one or more virtual buttons, and the like, to confirm transmission of the annotations and/or the video prior to transmittal to the first communication device 111, for example as actuated by the user 102. In some of these examples, the one or more virtual buttons may include virtual buttons to select whether annotations only, video only, or both annotations and video are transmitted.

At a block 312, the controller 220 establishes and/or conducts the video call. In some examples, the controller 220 is further configured to: establish the video call upon receipt of input from the input device 104, the input for accepting the video call (e.g. the user 102 operates the input device 104 to "answer" the video call); and, after the video call is established, transmit, to the first communication device 111, at least video from the video camera 103. In some examples, the video may be transmitted with the annotations, for example with the annotations overlayed on the video to identify objects in the video transmitted in the video call according to the annotations.

It is further understood that once the video call is established video is received at the device 101 from the first communication device 111.

In yet further examples, the device 101 and/or the controller 220 may be further configured to: establish a first video call with the first communication device 111, as described above, and, in response, transmit, to the first communication device 111, at least the video from the video camera 103; and receive a second video call from the second communication device 112 that is associated with: one or more of an unauthorized caller, as determined from the profile data 130, or a respective user not included in the profile data 130; and, in response: establish the second video call without annotations (and/or filtered annotations) and with respective video to the second communication device 112 filtered to remove at least background images and background audio.

The two video calls may occur simultaneously at the device 101 and the user 102 may switch between the two video calls using the input device 104. However, the filtering of video (and/or annotations) associated with the two video calls is maintained when the switching occurs. For example, the device 101 and/or the controller 220 may be further configured to: receive input, at the input device 104, to switch between the first video call and the second video call, wherein transmitted video is not filtered when switched to the first video call, and the transmitted video is filtered when switched to the second video call. Suitable filtering of annotations on the two video calls also occurs as the switching occurs (e.g. according to authorization level).

While in the method 300, and throughout the specification, the devices 101, 111, 112 are referred to, respectively, as the device 101, the first communication device 111 and the second communication device 112, alternatively the device 101 may be referred to as the first communication device 101, and the devices 111, 112 may be referred to as a plurality of second communication devices 111, 112 (e.g. relative to the first communication device 101), with the communication device 111 being a second communication device 111 of the plurality of second communication devices 111, 112, and the communication device 112 being a third communication device 112 of the plurality of second communication devices 111, 112. As such, the method 300 may alternatively be described a method 300 comprising: receiving, at a first communication device 101, a request for a video call from a second communication device 111, of a plurality of second communication devices 111, 112, the first communication device 101 having access to a memory (e.g. the database 105 and/or the memory 222) storing profile data 130 associated with users 121, 122 of one or more of the plurality of second communication devices 111, 112; and prior to the video call being established: determining, at the first communication device 101, whether a user 121 of the second communication device 111 is an authorized caller; and when the user 121 of the second communication device 11 is an authorized caller, transmitting, from the first communication device 101 to the second communication device 111, one or more of annotations received at an input device 104 and video from a video camera 103.

An example of the method 300 will now be described with respect to FIG. 4, FIG. 5, and FIG. 6.

Figure 4:
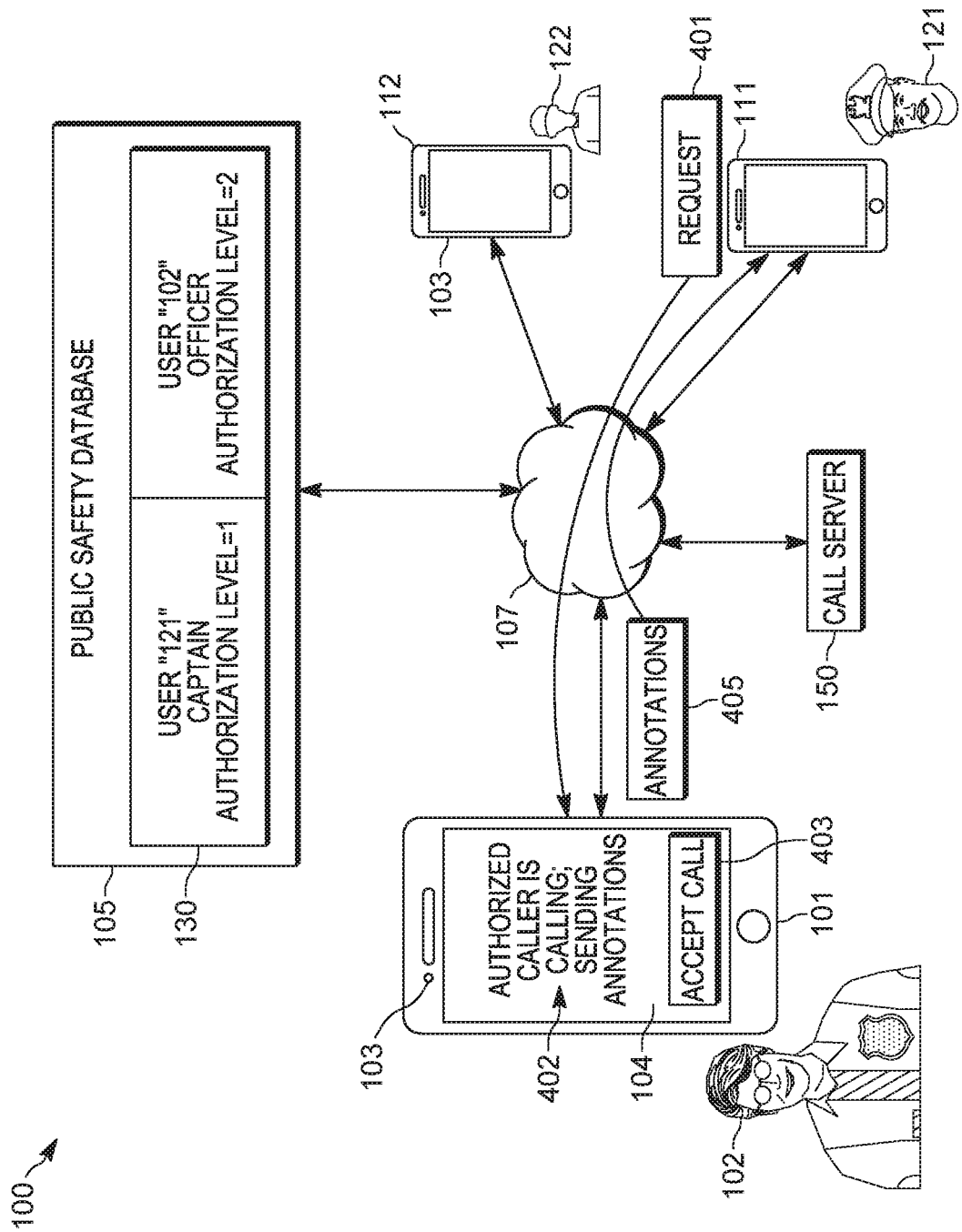
FIG. 4 depicts a method for transmitting one or more of annotations and video prior to a video call being implemented in the system of FIG. 1, in accordance with some examples.

Attention is next directed to FIG. 4 which is substantially similar to FIG. 1 with like elements having like numbers. In particular, in FIG. 4, the device 101 is receiving (e.g. at the block 302 of the method 300) a request 401 for a video call from the first communication device 111, for example via the call server 150. In response, the device 101 renders a "call answer" GUI 402 to answer the call that includes a virtual button 403 to cause the video call to be answered when actuated. However, prior to the video call being answered, the device 101 determines (e.g. a "YES" decision occurs at the block 306 of the method 300) that the user 121 is an authorized caller (e.g. as indicated in the GUI 402). While not depicted, the device 101 may further determine an authorization level of the user 121.

As depicted, prior to the video call being answered, the device 101 transmits annotations 405 (e.g. at the block 308 of the method 300). In the present example, video from the video camera 103 is not initially transmitted.

Figure 5:
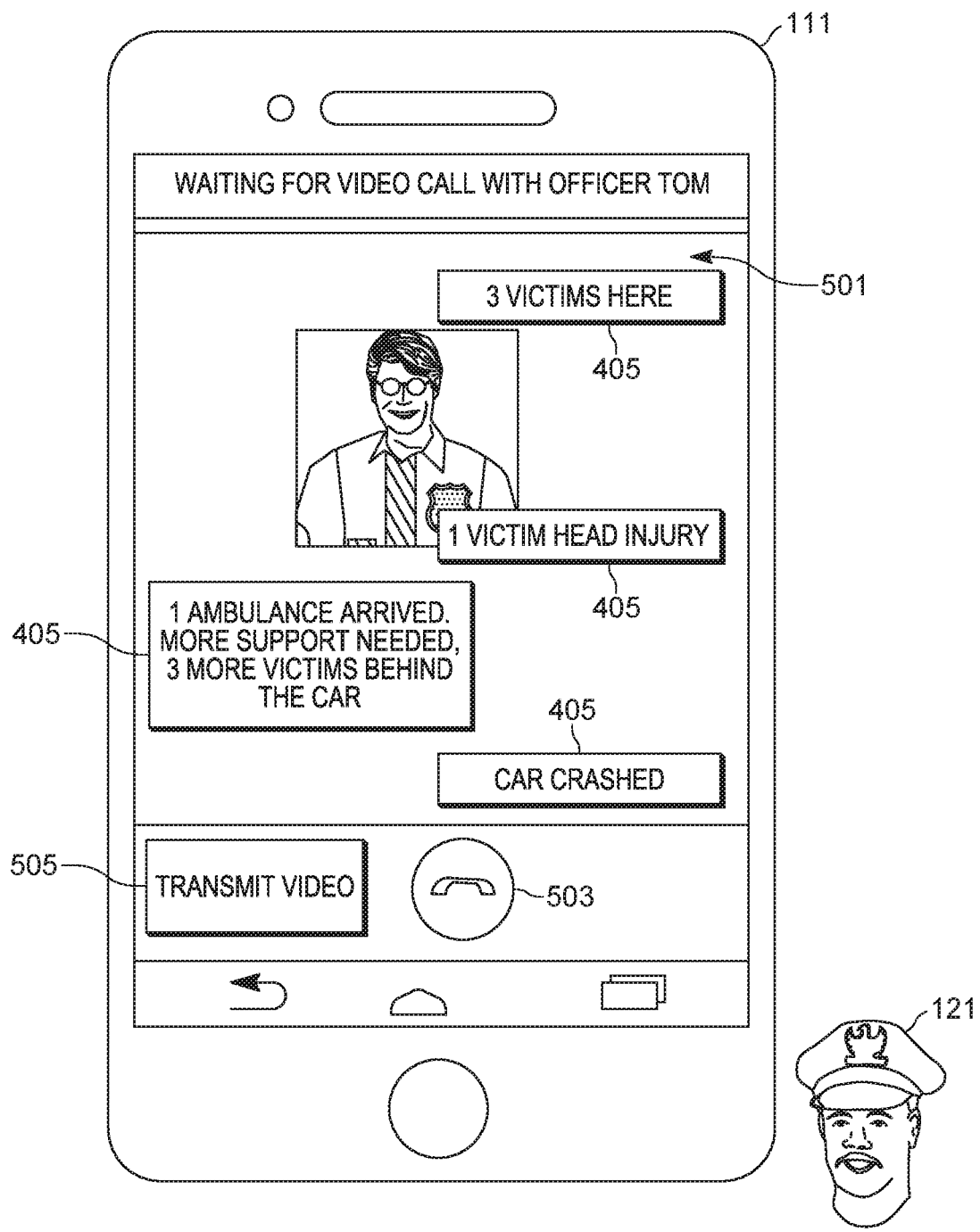
FIG. 5 depicts a graphic user interface of a communication device showing annotations received from another communication device implementing a method for transmitting one or more of annotations and video prior to a video call, in accordance with some examples.

Attention is next directed to FIG. 5 which depicts a "call ringing" GUI 501 at a display screen of the first communication device 111, provided and/or rendered in response to the request 401 being transmitted. For example, the GUI 501 is provided while the first communication device 111 is waiting for the device 101 to accept the video call.

The GUI 501 includes a call end virtual button 503 which may be actuated to end setting up the video call.

The GUI 501 is further depicted after the annotations 405 are received at the first communication device 111. As depicted the annotations 405 comprise text (e.g. notes) associated with a current incident to which the device 101 (and optionally the first communications device 111) is assigned. As such, the annotations 405 are provided with the GUI 501 to provide the user 121 with indications of the current incident. The annotations 405 may be provided so as to not obscure the virtual button 503 and/or other information and/or data and/or virtual buttons of the GUI 501. For example, as depicted, the GUI 501 further includes an image of the user 102 and an identifier of the user 102 (e.g. "Officer Tom" in an indication that the video call is not yet established "Waiting For Video Call With Officer Tom").

Furthermore, as depicted, the GUI 501 includes a virtual button 505 which, when actuated, causes a request and/or command to be transmitted to the device 101 (e.g. which is received at the device 101 at the block 310 of the method 300) to cause the device 101 to transmit (e.g. at the block 310) video from the video camera 103 prior to the video call being established.

Figure 6:
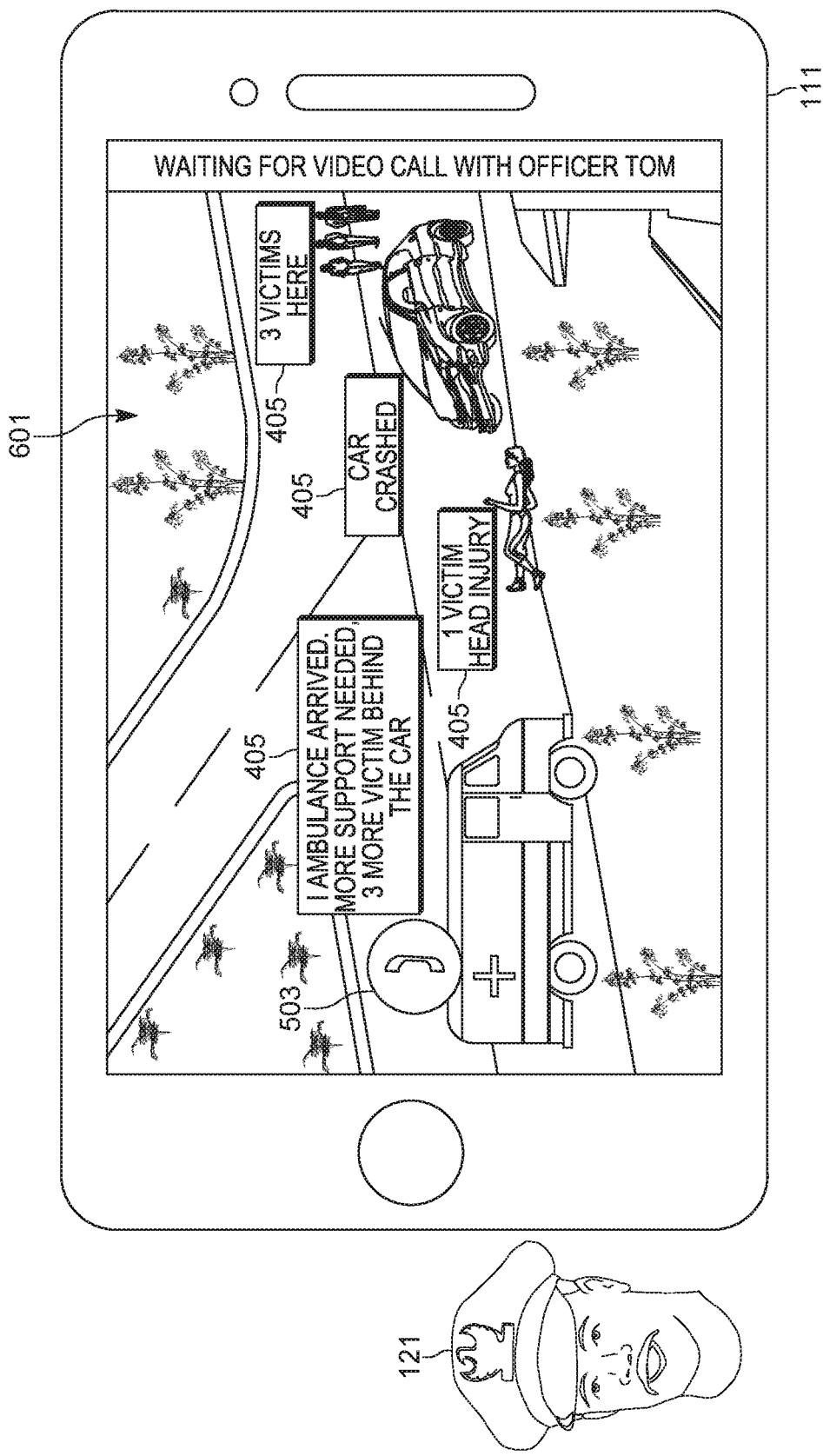
FIG. 6 depicts a graphic user interface of a communication device showing annotations and video as received from another communication device implementing a method for transmitting one or more of annotations and video prior to a video call, in accordance with some examples.

For example, attention is next directed to FIG. 6 which depicts another "call ringing" GUI 601 at a display screen of the first communication device 111, provided and/or rendered in response to video being transmitted to the first communication device 111 in response to the virtual button 505 being actuated. For example, the GUI 601 is provided after the GUI 501 while the first communication device 111 is waiting for the device 101 to accept the video call and/or for the video call to be established. The GUI 601 includes the virtual button 503 and the identifier of the user 102 (e.g. "Officer Tom" in an indication that the video call is not yet established "Waiting For Video Call With Officer Tom"). However, in contrast to FIG. 5, the GUI 601 includes the annotations 405 overlayed on video received from the video camera 103 of the device 101. As depicted, where possible (e.g. as determined by the controller 220 implementing a machine learning algorithm and the like), the annotations 405 are overlayed on associated portions of the video (e.g. the text "Car Crashed" is on a crashed car" etc.).

When an authorization level is determined for the user 121, the annotations 405 may be filtered at the GUI 501 and/or the GUI 601 according to the authorization level, as described above. Similarly, when an authorization level is determined for the user 121, the annotations 405 and/or the video may be filtered at the GUI 601 according to the authorization level, as described above.

It is further understood that the video of the GUI 601 may comprise video received in a one-way streaming of video from the video camera 103 to the first communication device 111 prior to the video call being established. Once the video call is established, the first communication device 111 may continue to render the video with the annotations 405 as depicted in the GUI 601, however, video is then transmitted from the first communication device 111 to the device 101. Indeed, it is understood that during rendering of the GUI 501 and/or the GUI 601, prior to the video call being established the first communication device 111 does not transmit video to the device 101 and/or the device 101 does not receive video from the first communication device 111.

In examples, where a video call is established with the second communication device 112 (e.g. associated with an unauthorized caller), annotations may not be transmitted, a virtual button 505 may not be provided at a call answer GUI and furthermore video (and/or annotations) transmitted on the video call established with the second communication device 112 may be filtered as described above.

Provided herein is a device, system and method for transmitting one or more of annotations and video prior to a video call for example to a communication device associated with an authorized user. The annotations and/or video may be filtered and/or redacted based on a determined authorization level of the authorized user. Annotations and/or video may be transmitted to a communication device of an unauthorized user, filtered and/or redacted based on a determined authorization level of the unauthorized user.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A communication device comprising:
a communication unit configured to communicate with other communication devices;
a video camera;
an input device; and
a controller communicatively coupled to the communication unit, the video camera, and the input device, the controller having access to a memory storing profile data associated with users of one or more of the other communication devices,
the controller configured to:
receive, via the communication unit, a request for a video call from a first communication device, of the other communication devices; and
prior to the video call being established:
determine whether a user of the first communication device is an authorized caller; and
when the user of the first communication device is an authorized caller, transmit, to the first communication device, via the communication unit, live video from the video camera.

2. The communication device of claim 1, wherein the controller is further configured to, prior to the video call being established:
when bandwidth available for the live video is below a threshold bandwidth, transmit annotations, received at the input device, to the first communication device without the live video; and
when the bandwidth available for the video is above the threshold bandwidth, transmit the annotations to the first communication device with the live video.

3. The communication device of claim 1, wherein the controller is further configured to, prior to the video call being established:
first transmit annotations, received at the input device, to the first communication device without the live video; and
transmit the live video to the first communication device.

4. The communication device of claim 1, wherein the controller is further configured to, prior to the video call being established: when the request for the video call is received, automatically transmit annotations, received at the input device, and the live video to the first communication device.

5. The communication device of claim 1, wherein the controller is further configured to: when the user of the first communication device is the authorized caller, transmit, to the first communication device, via the communication unit, the live video and one or more of annotations associated with a current incident assigned to a respective user of the communication device.

6. The communication device of claim 1, wherein the controller is further configured to:
establish the video call upon receipt of input from the input device, the input for accepting the video call; and, after the video call is established,
transmit, to the first communication device, at least the live video.

7. The communication device of claim 1, wherein the controller is further configured to:
prior to the video call being established, determine whether the user of the first communication device is an authorized caller, based on the profile data, and, when the user of the first communication device is one or more of an unauthorized caller or is not included in the profile data; and, in response:
prior to the video call being established, do not transmit annotations received at the input device, or the live video; and
after the video call is established: do not transmit the annotations; and transmit the live video with at least background images and background audio removed therefrom.

8. The communication device of claim 7, wherein the controller is further configured to:
after the video call is established: transmit the live video including one or more of foreground images and foreground audio of a respective user of the communication device.

9. The communication device of claim 1, wherein the controller is further configured to:
establish the video call and, in response, transmit, to the first communication device, at least the live video;
receive a second video call from a second communication device that is associated with: one or more of an unauthorized caller, as determined from the profile data, or a respective user not included in the profile data; and, in response: establish the second video call without annotations, received at the input device, and with respective live video to the second communication device filtered to remove at least background images and background audio; and
receive input, at the input device, to switch between the video call and the second video call, wherein transmitted live video is not filtered when switched to the video call, and the transmitted live video is filtered when switched to the second video call.

10. The communication device of claim 1, wherein the controller is further configured to one or more of:
determine an authorization level of the user of the first communication device; and redact a portion of annotations, received at the input device, based on the authorization level, wherein the authorization level is determined based on whether the user is an authorized caller or an unauthorized caller, and wherein, when the user is an unauthorized caller, a portion of the annotations is transmitted to the first communication device based on the authorization level.

11. A method comprising:
receiving, at a first communication device, a request for a video call from a second communication device, of a plurality of second communication devices, the first communication device having access to a memory storing profile data associated with users of one or more of the plurality of second communication devices; and
prior to the video call being established:
determining, at the first communication device, whether a user of the second communication device is an authorized caller; and
when the user of the second communication device is an authorized caller, transmitting, from the first communication device to the second communication device, live video from a video camera.

12. The method of claim 11, further comprising, prior to the video call being established:
when bandwidth available for the live video is below a threshold bandwidth, transmitting, from the first communication device to the second communication device, annotations, received at an input device, without the live video; and
when the bandwidth available for the video is above the threshold bandwidth, transmitting, from the first communication device to the second communication device, the annotations with the live video.

13. The method of claim 11, further comprising, prior to the video call being established:
first transmitting, from the first communication device to the second communication device, annotations, received at an input device, without the live video; and
transmitting, from the first communication device to the second communication device, the live video.

14. The method of claim 11, further comprising, prior to the video call being established: when the request for the video call is received, automatically transmitting, from the first communication device to the second communication device, annotations, received at an input device and the live video.

15. The method of claim 11, further comprising when the user of the first communication device is the authorized caller, transmitting, to the first communication device, the live video and one or more of annotations associated with a current incident assigned to a respective user of the first communication device.

16. The method of claim 11, further comprising:
establishing, at the first communication device, the video call upon receipt of input from the input device, the input for accepting the video call; and, after the video call is established,
transmitting, from the first communication device to the second communication device, at least the live video.

17. The method of claim 11, further comprising:
prior to the video call being established, determining, at the first communication device, whether the user of the second communication device is an authorized caller based on the profile data, and, when the user of the second communication device is one or more of an unauthorized caller or is not included in the profile data; and, in response:
prior to the video call being established, not transmitting, at the first communication device, annotations, received at an input device, or the live video; and
after the video call is established: not transmitting, at the first communication device, the annotations; and transmitting, at the first communication device, the live video with at least background images and background audio removed therefrom.

18. The method of claim 17, further comprising:
after the video call is established: transmitting, from the first communication device to the second communication device, the live video including one or more of foreground images and foreground audio of a respective user of the first communication device.

19. The method of claim 11, further comprising:
establishing, at the first communication device, the video call and, in response, transmitting, from the first communication device to the second communication device, at least the live video;
receiving, at the first communication device, a second video call from a third communication device that is associated with: one or more of an unauthorized caller, as determined from the profile data, or a respective user not included in the profile data; and, in response: establishing, at the first communication device, the second video call without annotations, received at an input device, and with respective live video transmitted to the third communication device filtered to remove at least background images and background audio; and
receiving, at the first communication device, input from the input device, to switch between the video call and the second video call, wherein transmitted live video is not filtered when switched to the video call, and the transmitted live video is filtered when switched to the second video call.

20. The method of claim 11, further comprising one or more of:
determining, at the first communication device, an authorization level of the user of the second communication device; and redacting, at the first communication device, a portion of annotations, received at an input device, based on the authorization level, wherein the authorization level is determined based on whether the user is an authorized caller or an unauthorized caller, and wherein, when the user is an unauthorized caller, a portion of the annotations is transmitted to the second communication device based on the authorization level.

* * * * *